(12) United States Patent
Ichi et al.

(10) Patent No.: US 7,192,456 B2
(45) Date of Patent: Mar. 20, 2007

(54) METHOD OF PREPARING A PURIFIED PURPLE CORN COLORING AGENT

(75) Inventors: Takahito Ichi, Toyonaka (JP); Makoto Sakata, Toyonaka (JP); Hiromitsu Aoki, Toyonaka (JP); Takatoshi Koda, Toyonaka (JP)

(73) Assignee: San-Ei Gen F.F.I., Inc.,, Toyonaka (JP)

( * ) Notice: Subject to any disclaimer, the term of this patent is extended or adjusted under 35 U.S.C. 154(b) by 0 days.

(21) Appl. No.: 10/502,058

(22) PCT Filed: Feb. 1, 2002

(86) PCT No.: PCT/JP02/00822

§ 371 (c)(1),
(2), (4) Date: Mar. 3, 2005

(87) PCT Pub. No.: WO03/064538

PCT Pub. Date: Aug. 7, 2003

(65) Prior Publication Data

US 2005/0125915 A1   Jun. 16, 2005

(51) Int. Cl.
*C09B 61/00* (2006.01)

(52) U.S. Cl. .................... 8/438; 8/636; 8/646; 210/651

(58) Field of Classification Search .................. 8/438, 8/636, 646; 210/651
See application file for complete search history.

(56) References Cited

U.S. PATENT DOCUMENTS 4,320,009 A    3/1982    Hilton et al.

FOREIGN PATENT DOCUMENTS

| JP | 52-130824 | 11/1977 |
| JP | 59-223756 | 12/1984 |
| JP | 59-223756 A * | 12/1984 |
| JP | 61-36364 | 2/1986 |
| JP | 61-36364 A * | 2/1986 |
| JP | 62-19068 | 1/1987 |
| JP | 6-271850 | 9/1994 |
| JP | 2001-348507 | 12/2001 |
| JP | 2002-47432 | 2/2002 |
| JP | 2002-53468 | 2/2002 |
| WO | 01/90254 | 11/2001 |

OTHER PUBLICATIONS

Aoki et al. "Anthocyanins isolated from purple corn." Foods and Food Ingredients Journal of Japan, 2002, 199, 41-45.*
Nakatani et al. "Major Anthocyanin of Bolivian Purple Corn (*Zea mays* L.)" Agric. Biol. Chem. 43 (2), 389-391, 1979.*
Fossen et al. Anthocyanins from Maize (*Zea mays*) and Reed Canarygrass (*Phalaris arundinacea*). J. Agr. Food Chem., 2001, 49, 2318-2321.*
H. Aoki, et al.; "Shokuhin Tennen Shikiso no Kinosei to Shinki Riyo"; *Gekkan Food Chemicals*; vol. 17; No. 1; Jan. 1, 2001; pp. 65-72./Cited in the International Search Report.
Hiromitsu Aoki et al., "Shokuhin Tennen Shikiso no Kinosei to Shinki Riyo", *Gekkan Food Chemicals*, vol. 17, No. 1, Jan. 1, 2001, pp. 65-72.

* cited by examiner

*Primary Examiner*—Lorna M. Douyon
*Assistant Examiner*—Tri Nguyen
(74) *Attorney, Agent, or Firm*—Armstrong, Kratz, Quintos, Hanson & Brooks, LLP.

(57) ABSTRACT

A method of preparing a purified purple corn coloring agent comprising passing a purple corn color extract solution through an adsorption resin, washing with water, and releasing the purple corn color from the resin with the use of an aqueous solution containing alcohol of 25 to 45 v/vt %.

11 Claims, 2 Drawing Sheets

METHOD OF PREPARING A PURIFIED PURPLE CORN COLORING AGENT

TECHNICAL FIELD

The present invention relates to an odorless or low-odor purple corn color having a significantly reduced or eliminated odor, and a color preparation comprising the color. The invention also relates to an odorless or low-odor purple corn color whose odor emission when exposed to light or heat during storage is significantly inhibited, and a color composition comprising the color. The invention further relates to an odorless or low-odor purple corn color free of fumonisins, and a color composition comprising the color.

The invention further relates to a method for purifying a purple corn color, which is capable of significantly eliminating fumonisins that may be contained in a purple corn color extract solution. Another way of saying, the invention relates to a method for preparing an odorless or low-odor purple corn color.

BACKGROUND ART

Purple corn colors, a type of anthocyanin colors, are widely used, chiefly for coloring foodstuffs including beverages. Purple corn colors, however, have characteristic odor components and impurities derived from purple corn used as a raw material. Therefore, when purple corn colors are used in foodstuffs or like products, it is likely that odor and precipitates produced by the odor components and impurities will adversely affect the flavor and taste of such foodstuffs. Consequently, there has been demand for a color preparation comprising a purple corn color that has been significantly reduced or eliminated the odor components and impurities characteristic of purple corn. So far, and various purification processes have been proposed.

Nevertheless, no process is known to effectively remove the characteristic odor of purple corn colors, and thus conventional purple corn color preparations unavoidably have the peculiar odor derived from purple corn.

Another problem is that conventional purple corn color preparations exhibit an "odor regression" phenomenon, in which their odor gradually increases during long-term storage as a result of deterioration with time under the influence of heat, light, etc.

Further, purple corn color and preparations thereof need to be prepared so as not to be polluted with mycotoxins such as fumonisins, which may occur in purple corn used as a raw material, because they are widely used as food coloring agents.

SUMMARY OF THE INVENTION

An object of the present invention is to provide a safe purple corn color that can be safely used as a coloring agent for foodstuffs, drugs, quasi-drugs, cosmetics and the like, without affecting their taste or flavor.

Stated specifically, the first object of the invention is to provide a purple corn color that contains a significantly reduced or eliminated amount of odor derived from odor components in purple corn, which is prepared by removing the odor components from purple corn, and a color preparation comprising the color. The second object of the invention is to provide a purple corn color free of deterioration in quality with time, such as "recurrence of odor", caused under the influence of heat or light during long-term storage, and a color preparation comprising the color. The third object of the invention is to provide a purple corn color in which the odor components and impurities have been significantly reduced and which contains a significantly reduced or eliminated amount of fumonisins (mycotoxins), and a color preparation comprising the color. The fourth object of the invention is to provide a method for purifying a purple corn color, in particular a method effective for eliminating fumonisins produced by molds occurring on purple corn used as a raw material.

The present inventors conducted extensive research to solve the conventional problems of purple corn colors, and found an effective method for preparing the objective colors which is selectively eliminated odor-causing impurity and fumonisins from a purple corn color extract solution, thus they have developed purple corn colors which meet the objects of the invention.

The invention provides the following methods (1) to (10) for preparing purple corn colors:

(1) A method for preparing a purple corn color, which comprises the steps of passing a purple corn color extract solution through an adsorption resin, washing the resin with water, and desorbing a purple corn color from the resin using 25 to 45% v/v hydroalcoholic solution as a desorption solution.

(2) The method according to item (1), wherein the purple corn color extract solution is an acid water or an aqueous acid solution containing no more than 20% v/v alcohol.

(3) The method according to item (1) or (2), wherein after washing the resin with water, 1.5 to 2.5 times as much desorption solution as the resin by volume is passed through the resin at a SV (space velocity) of 0.8 to 1.5.

(4) The method according to any one of items (1) to (3), wherein the adsorption resin is a cross-linked styrene porous polymer.

(5) The method according to any one of items (1) to (4), which comprises as a process for eliminating fumonisins the steps of passing a purple corn color extract solution through an adsorption resin, washing the resin with water, and desorbing a purple corn color from the resin using 25 to 45% v/v hydroalcoholic solution.

(6) A method for preparing a purple corn color, which comprises the step of subjecting an adsorption-treated solution obtained by any one method of items (1) to (5) to at least one treatment selected from adsorption treatment, ion exchange treatment, acid treatment, extraction treatment and membrane separation treatment.

(7) The method according to item (6), wherein the membrane separation treatment is carried out after a process according to any one of items (1) to (5).

(8) The method according to item (6) or (7), wherein the membrane separation treatment is at least one of reverse osmosis membrane treatment or ultrafiltration membrane treatment.

(9) The method according to item (7), wherein the acid treatment is carried out before the membrane separation treatment.

(10) The method according to item (9), wherein the acid treatment is carried out under high-temperature condition.

The method for preparing a purple corn color according to any one of Items (1) to (6) can be restate that a method for eliminating fumonisins from purple corn color extract solution. Further, the method for preparing a purple corn color according to any one of Items (1) to (10) can be restate that a method for purifying purple corn colors.

The present invention provides the following purple corn colors (11) to (14):

(11) A purple corn color obtained by the method according to any one of items (1) to (10), which is characterized in being free of fumonisins.
(12) The purple corn color obtained by the method according to any one of items (1) to (10), wherein the concentration of the odor components is not higher than 150 ppm when the purple corn color is adjusted to a color value of $$E^{10\%}_{1cm} = 60$$

(13) The purple corn color according to item (12), wherein the odor component is at least one member selected from the group consisting of acetic acid, malonic acid diethyl ester, 4-vinyl-2-methoxyphenol and 4-vinylphenol.
(14) A purple corn color obtained by the method according to any one of items (1) to (10), wherein the total concentration of acetic acid, malonic acid diethyl ester, 4-vinyl-2-methoxyphenol and/or 4-vinylphenol is not higher than 20 ppm when the purple corn color is adjusted to a color value of $$E^{10\%}_{1cm} = 60$$

The invention also provides a color preparation comprising the purple corn color according to any one of items (11) to (14).

BRIEF DESCRIPTION OF THE DRAWINGS

In FIG. 1, the peak ①, ②, ③ and ④ are attributable to acetic acid, malonic acid diethyl ester, 4-vinyl-2-methoxyphenol and 4-vinylphenol, respectively. The peak IS-1 is attributable to methyl octanoate as an internal standard substance.

BEST MODE CARRING OUT THE INVENTION

Figure 1:
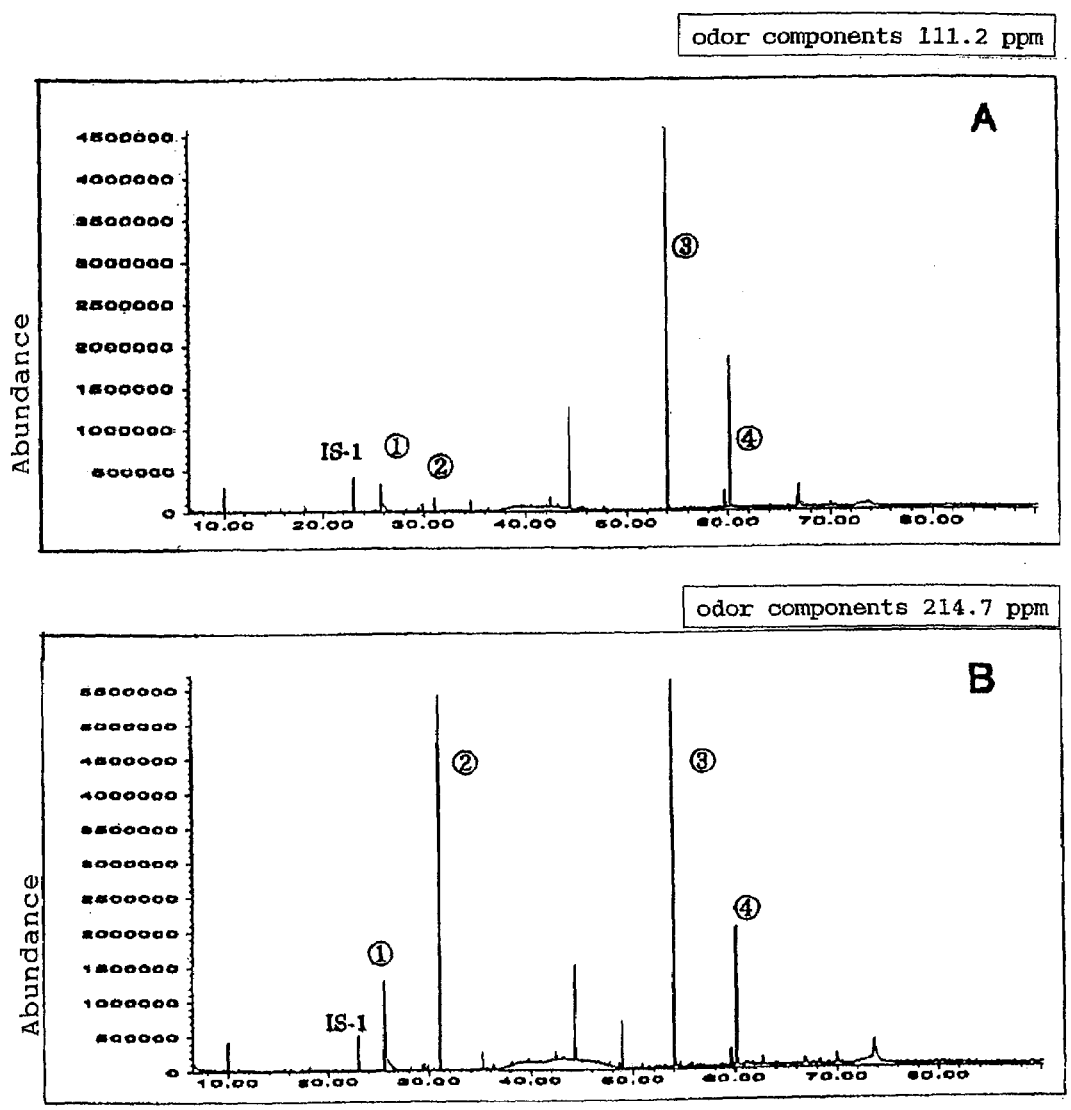
FIG. 1 shows the results of measuring the amounts of odor components in the purple corn color preparation of the present invention (FIG. A) and the comparative purple corn color preparation (FIG. B), with a gas chromatography-mass spectrometer (GC-MS) in Experiment 2.

The purple corn color of the present invention contains a significantly reduced or eliminated amount of odor components or impurities derived from purple corn used as a raw material.

The purple corn color for use in the invention is an anthocyanin color widely utilized chiefly for coloring foodstuffs such as beverages and sweets, and prepared using purple corn (*Zea mays* L.: family Gramineae) as a raw material.

As used herein, "color value" means a value obtained as follows: An absorbance of a solution containing a purple corn color (in a buffer solution of pH 3.0) is measured at the maximum absorption wavelength in the visible region (around 510 nm). The absorbance is then converted to an absorbance of a 10% w/v solution.

As used herein, "odor component" means a volatile odor component which is derived from purple corn and causes an unpleasant or offensive odor. Specific examples of odor components include, but are not limited to, acetic acid, malonic acid diethyl ester, 4-vinyl-2-methoxyphenol and 4-vinylphenol. Examples of impurities include sparingly or slightly water-soluble color components, waxes, pesticide residue, molds occurring on crops, and substances produced by the molds (such as fumonisins).

Fumonlsins include fumonisin A1, fumonisin A2, fumonisin B2, fumonisin B3 and the like. They are produced by molds (e.g., *Fusarium moniliforme* and *F. proliferatum*) occurring on grains such as corn, and reportedly have toxicity such as hepatic carcinogenicity.

The purple corn color of the present invention is characterized in that, when the color value of the color is adjusted to $$E^{10\%}_{1cm} = 60$$

the total concentration of odor components in the color is not higher than 150 ppm. The odor component concentration is substantially proportional to the color value. Therefore, it is not necessary for the purple corn color of the invention itself to have the above color value, as long as the color has an odor component concentration within the above range when adjusted to the above color value.

Preferably, the purple corn color of the invention, when adjusted to the above color value, has a total concentration of acetic acid, malonic acid diethyl ester, 4-vinyl-2-methoxyphenol and 4-vinylphenol of not higher than about 50 ppm, more preferably not higher than about 20 ppm. These substances are purple corn-derived volatile odor components that cause an offensive odor.

The corn color of the invention, which is odorless or low-odor because of the greatly lowered odor component concentration, can be prepared by subjecting a purple corn color extract solution to any one treatment selected from adsorption treatment, ion exchange treatment, pH adjustment treatment, extraction treatment and membrane separation treatment, or to any combination of at least two of these treatments. A preferred example of pH adjustment treatment is acid treatment.

The purple corn color extract solution for use in the invention is a solvent extract of a purple corn plant body. Any portion of the plant body containing the desired purple corn color can be used for the extraction. Thus, the plant body may be used in whole or in part (e.g., an ear developed from a female flower, including the kernel and cob). Also the plant body may be a callus of a purple corn plant. All or part of an unprocessed plant or its ground product may be used in the extraction. Alternatively, the plant may be dried and then optionally ground into a powder, for use in the extraction.

Any solvents capable of extracting the color from purple corn can be used for the extraction, without limitation. Preferred examples include alcohols, water and their mixtures. Examples of alcohols include methanol, ethanol, propanol, isopropyl alcohol, butanol and like $C_{1-4}$ lower alcohols. Preferred is an acid water or an acid hydroalcoholic solution. Preferred acid waters or acid hydroalcoholic solutions are those adjusted to a pH of about 1 to 5, preferably about 1 to 4, with an inorganic acid such as hydrochloric acid, sulfuric acid or phosphoric acid or with an organic acid such as citric acid or malic acid. Preferred hydroalcoholic solutions are those having an alcohol content of not greater than 20% by volume.

The extraction can be carried out by a conventional method. Examples of extraction methods include, but are not limited to, cold or hot immersion of all or part of the plant (in unchopped or coarsely or finely chopped form), or a dry ground product (such as powder) of the chopped or unchopped whole or part of the plant; extraction with heating and stirring followed by filtration to obtain an extract; and percolation.

The obtained extract is subjected to, as required, filtration, coprecipitation or centrifugation to remove solids. The resultant extract can then be optionally concentrated, before being subjected to adsorption treatment. The adsorption treatment can be carried out in a conventional manner, for example, using activated carbon, silica gel, porous ceramics, various types of synthetic adsorption resin or the like. The synthetic adsorption resins include, but are not limited to, cross-linked styrene-based or acrylic porous polymer. In particular, cross-linked styrene-based porous polymer includes styrene-vinylbenzene copolymer such as commercially available Diaion HP10, Diaion HP20, Diaion HP21, Diaion HP40 or Diaion HP 50 (trademarks of Mitsubishi Chemical Co.); Sepabeads SP70, Sepabeads SP700 or Sepabeads SP825 (trademarks of Mitsubishi Chemical Co.); and, Amberlite XAD-4, Duolite S874 or Duolite S876 (trademarks of Rohin & Haas Company). Acrylic porous polymer includes commercially available Amberlite XAD-7, Amberlite XAD-8 or Amberlite XAD-2000 (trademarks of Rohm & Haas Company); and Duolite S877 (trademarks of Rohm & Haas Company). The preferred synthetic adsorption resin used in the present invention is cross-linked styrene-based porous polymer, preferably styrene-vinylbenzene copolymer, more preferably adsorption resin of Diaion HP series. It is suitable that the adsorption resin has a specific surface area of about 600 $m^2/g$, and a pore radius of 100 to 400 Å, preferably 200 to 300 Å.

Then, the resin adsorbing a purple corn color extract solution is subjected to a desorption treatment after washing. The washing of the resin is carried out using water. In particular, the resin adsorbing a purple corn color extract solution is washed with 2 to 5 times, preferably 3 to 4 times, as much water as the resin by volume. The desorption treatment is carried out by passing hydroalcoholic solution as a desorption solution through the resin adsorbing a purple corn color. The hydroalcoholic solution is an aqueous solution comprising an alcohol, preferably ethanol. at a concentration of 25 to 45% v/v, preferably 28 to 40% v/v, more preferably 28 to 35% v/v. Use of a desorption solution with such an alcohol concentration makes it possible to effectively desorb and recover the purple corn color from the resin, while maintaining fumonisins in an adsorbed state on the resin. It is desirable that the desorption solution be used in an amount 1 to 3 times, preferably 1.5 to 2.5 times, as much as the volume of the resin.

The temperature for the above absorption resin treatment is not limited, but is usually room temperature. The purple corn color extract solution, washing solution (water) and desorption solution are usually passed at a SV (space velocity) of 0.1 to 5, preferably 0.5 to 3, more preferably 0.8 to 1.5.

Thus, an adsorption-treated solution of a purple corn color extract solution can be obtained from which fumonisins have been significantly eliminated. The adsorption-treated solution obtained from a purple corn color extract solution may be subjected to follow-up adsorption treatment, or further treatment such as ion exchange treatment, membrane separation treatment, extraction treatment, pH treatment (acid treatment) or the like.

The follow-up adsorption treatment can be carried out in the manner described above.

The ion exchange treatment may be cation exchange treatment or anion exchange treatment, and can be carried out in a routine manner using a conventional resin without limitation. Usable cation exchange resins are not limited but include, for example, Diaion SK 1B, Diaion SK 102, Diakon SK 116, Diaion PK 208, Diaion WK 10 and Diaion WK 20 (trademarks of Mitsubishi Chemical Co.). Usable anion exchange resins are not limited but include, for example, Diaion SA 10A, Diaion SA 12A, Diaion SA 20A, Diaion PA 306, Diaion WA 10 and Diaion WA 20 (trademarks of Mitsubishi Chemical Co.).

In the present invention, the membrane separation treatment can be carried out by any filtration method using a membrane. Examples of such filtration methods include a method using a functional high molecular weight membrane such as a membrane filter (MF) membrane, an ultrafiltration (UF) membrane, a reverse osmosis membrane or an electrodialysis membrane. Known membrane separation methods include, In addition to the ultrafiltration method and reverse osmosis method using the above membranes, a dialysis method utilizing a concentration gradient across an ion separation membrane, and an electrodyalysis method wherein an ion exchange membrane is used and a voltage is applied to the membrane. For industrial purposes, the reverse osmosis membrane separation method is preferred. The membrane for use in these membrane separation methods may be made of any of natural, synthetic and semi-synthetic materials. Examples of such materials include cellulose, cellulose di- or tri-acetate, polyamide, polysulfone, polystyrene, and polyimide, polyacrylonitrile.

The membrane separation method performed in the invention may includes a method for separating and removing high molecular weight compounds through a membrane having a molecular-weight cutoff of, for example, $10^4$ to $10^6$, and a method for separating and removing low molecular weight compounds through a membrane having a molecular-weight cutoff of about 2000 to 4000, preferably about 3000, Specific examples of the former method include a method using an ultrafiltration membrane such as NTU-3150 membrane, NTU-3250 membrane, NTU-3550 membrane or NTU-3800 UF membrane (manufactured by Nitto Denko Corp.); Cefilt-UF (manufactured by Nippon Gaishi Inc.); or AHP-2013 membrane, AHP-3013 membrane or AHP-1010 membrane (manufactured by Asahi Kaset Corp.). Specific examples of the latter method include a method using a reverse osmosis membrane (nanofiltration membrane, a preferred molecular-weight cutoff: about 3000) such as NTR-7250 membrane, NTR-7410 membrane, NTR-7430 membrane or NTR-7450 membrane (manufactured by Nitto Denko Corp.); or AIP-3013 membrane, ACP-3013 membrane, ACP-2013 membrane, AIP-2013 membrane or AIO-1010 membrane (manufactured by Asahi Kasei Corp.). These methods can be carried out either singly or in combination.

In the invention, the extraction treatment is not limited, and may includes a method comprising the step of contacting an adsorption-treated solution obtained from a purple corn color extract solution, with carbon dioxide, ethylene, propane or the like within a sealed apparatus at a temperature and pressure not lower than the critical point.

The pH adjustment treatment (including acid treatment) can be performed by a method wherein an adsorption-treated solution of a purple corn color extract solution, or a solution which has been subjected to one or more of the above treatments, is adjusted to pH 1 to 4 and exposed to acidic conditions. Preferably, the pH adjustment treatment is acid treatment involving exposure to conditions of pH 1.5 to 2. Specifically stated, the acid treatment can be carried out easily by adding an acid to the solution to be treated. The acid is not limited and can be selected from acids usually used as food additives, such as citric acid, acetic acid, malic acid, lactic acid and like organic acids, and sulfuric acid, hydrochloric acid, phosphoric acid, nitric acid and like inorganic acids. Preferably, the acid treatment is carried out using an inorganic acid usually used as a food additive.

The temperature for the acid treatment is not limited and can be selected within the range from 5 to 100° C. The time period for the acid treatment is not limited, and can be selected usually within the range from 1 to 300 minutes. Preferably, the acid treatment is carried out at a higher temperature, for example, from 40 to 100° C., more preferably from 50 to 80° C. When the treatment is carried out at 40 to 100° C. or 50 to 80° C., the time period for the treatment can be selected within the range from 1 to 60 minutes or 10 to 30 minutes, respectively. The acid treatment can be carried out with or without stirring.

The adsorption-treated solution of a purple corn color extract solution may be subjected to one of the above treatments, or any combination of two or more of the treatments in any order. Alternatively, one of the treatments may be performed repeatedly under the same or different conditions.

Preferred treatment methods include, but not limited to, a method wherein a purple corn color extract solution is subjected to adsorption treatment and, after desorption, further subjected to membrane separation treatment. More preferred treatment methods include a method wherein a purple corn color extract solution is subjected to adsorption treatment and, after desorption, further subjected to acid treatment and then membrane separation treatment. Preferably, the acid treatment can be carried out at a higher temperature. If necessary, ion exchange treatment (preferably anion exchange resin treatment) may be performed after the adsorption-desorption treatment.

The membrane separation treatment is preferably reverse osmosis membrane treatment or ultrafiltration membrane treatment, in particular reverse osmosis membrane treatment. It is recommended to carry out the membrane separation treatment using a membrane having a molecular-weight cutoff of 2000 to 4000, preferably about 3000.

Generally, Gramineae plants including corn are susceptible to pollution with fumonisins (mycotoxins). It is possible that purple corn used as a raw material of the color of the invention, which is a species of corn, is polluted with fumonisins. By the methods of the present invention, fumonisins are effectively eliminated from the purple corn color, if purple corn as a raw material is polluted with fumonisins. Accordingly, the invention provides a safe purple corn color free of fumonisins. The phrase "free of fumonisins" used herein means that the fumonisin concentration in a color or color preparation is not higher than the detection limit of fumonisins (i.e., not higher than 0.2 ppm).

The purple corn color of the present invention thus obtained is effectively freed of the odor components and impurities including fumonisins derived from purple corn. Therefore, the purple corn color of the invention is odorless or has such a low odor that the color, when added to a food, has substantially no influence on the taste and flavor of the food. The purple corn color of the present invention obtained in the above manner does not undergo changes over time, such as "recurrence of odor", even under heat and light during long-term storage. This is presumably because the methods according to the invention decomposes or eliminates the precursor of odor components contained in impurities, which are likely to produce an offensive or unpleasant odor, as well as odor components in impurities.

The purple corn color of the present invention thus obtained can be formulated into a color preparation in the form of solution or dispersion in a solvent such as water or an alcohol (e.g., ethanol), or in the form of powder, granules, tablets, pellets or like dry product.

Accordingly, the present invention provides a color preparation comprising the purple corn color, which is safely used as a coloring agent for foodstuffs, drugs, quasi-drugs, cosmetics and the like. The color preparation of the present invention may contain, in addition to the purple corn color of the invention, carriers and additives acceptable for foodstuff or medicine. Specific examples of such carriers and additives include dextrin, lactose, powdered starch syrup, and preservatives, stabilizers, antioxidants and other additives for foodstuff or medicine usually used in colors and color preparations.

EXAMPLES

The following Examples and Comparative Examples are provided to illustrate the invention in greater detail, and are not to limit the scope of the claims of the invention.

Referent Example

Preparation of a Purple Corn Color Extract Solution 2 kg of dry purple corn (ears including cobs and kernels) was placed in a mixture (pH 2.3) of 16 L of water, 4 L of ethanol and 90 g of sulfuric acid, and allowed to stand at room temperature overnight to extract red color. The extract solution was separated into solid and liquid fractions through a 60-mesh wire net. A filter aid and diatomaceous earth were added to the separated liquid. The resulting mixture was filtered through a filter paper, to thereby obtain about 16 L of purple corn color extract solution.

Experiment 1

Standard fumonisin B1 was added to the purple corn color extract solution (about 16 L) was obtained in the same manner as in the Referent Example. The fumonisin-containing extract solution (16 L) was passed through 1.5 L of an adsorption resin (a styrene vinylbenzene copolymer: Diaion HP20 manufactured by Mitsubishi Chemical Corp.) at a VP of 1, at 20° C. Then, the resin was washed with 5 L of water at a VP of 1. Thereafter, an aqueous solution containing ethanol concentration of 30% v/v (30% v/v aqueous ethanol solution) (3 L) was passed through the resulting resin (SV=1, at 20° C.), followed by recovery of the eluate (Invention preparation). Separately, as a comparative experiment, desorption from the resin is carried out in the same manner as above except for using a 50v/v aqueous ethanol solution in place of the 30% v/v aqueous ethanol solution as an elution solution, followed by recovery of the eluate (Comparative preparation). The resultant two recovered eluates were concentrated under reduce pressure, to hereby obtained 800 g of color solution having a color value of $E^{10\%}_{1cm}=100$. To each of the color solution (800 g) was added 227 g of water, 40 g of citric acid (crystals) and 266 g of ethanol, to prepare 1333 g of purple corn color preparation having a color value of $E^{10\%}_{1cm}=60$.

Using the resultant two purple corn color preparations (Invention preparation, Comparative preparation) as samples, the amount of mycotoxin (fumonisin) was measured using high-performance liquid chromatography (HPLC). Specifically, 1 g of each preparation (color value of $E^{10\%}{}_{1cm}=60$) was diluted with 50 mL of mixture of methanol/water (3:1), adjusted to pH 7.0 with 1N sodium hydroxide, and filtered through 0.5 μm membrane. The filtrate was flowed by gravity through a Bond Elut SAX (Varian Calif. 90710) column, i.e., a solid phase extraction cartridge, to adsorb fumonisin. After washing the column with 10 ml of mixture of methanol/water (3:1) and 5 ml of methanol, the fumonisin was eluted with 30 to 40 ml of methanol containing 1% acetic acid. The fumonisinluate was dried under reduced pressure and dissolved in 200 μl of 0.1M boric acid buffer (pH 8.7) to obtain an analysis sample.

Using this sample, the amount of mycotoxin (fumonisin) was measured under the following HPLC analysis conditions:

<HPLC analysis conditions>
Column: L-column ODS (4.6 mm in diameter, 250 mm in length; manufactured by Kagakuhin Kensa Kyokai)
Column temperature: 35° C.
Mobile phase: mixture of methanol/water (3:2) containing 0.05% trifluoroacetic acid
Flow rate of mobile phase: 1.0 ml/min
Reaction tube: ID 0.25 mm×5000 mm (SUS), charged after passage of the sample through the column and before detection
Reaction tube temperature: 50° C.
Reaction mixture: 0.08% o-phthalaldehyde and pH 10.0 solution of 0.1N-acetyl-L-cysteine in 0.4M boric acid buffer; poured after the passage of the sample through the column and before the passage of the sample through the reaction tube
Flow rate of reaction mixture: 0.4 ml/min
Detection wavelength: fluorescence excitation wavelength 340 nm: fluorescence measurement wavelength 450 nm In the result, no fumonisin B1 was detected in the Invention preparation (0 ppm) which was prepared using the 30% v/v aqueous ethanol solution as an elution solution, whereas 3 ppm of fumonisin B1 was detected in the Comparative preparation which was prepared using the 50% V/V aqueous ethanol solution as an elution solution. These results demonstrate that the method of the present invention is effective for significantly eliminating the fumonisins.

Experiment 2

(1) Preparation of a Purple Corn Color Preparation (i) Sixteen liters of purple corn color extract solution was obtained in the same manner as in Referent Example, and subjected to adsorption treatment with synthetic adsorption resin Amberlite XAD-7 (1.5 L, acrylic ester resin, Rohm & Hass Company). The resin was fully washed with 5 L of water, and subjected to gradient elution using aqueous solution containing ethanol concentration of 0% and 50% v/v. Then, the red fraction was collected by visual inspection, giving 4.8 L of purple corn color eluate, corresponding to an fraction eluted by 30 to 40% v/v aqueous ethanol solution. The eluate was filtered through an ultrafiltration membrane (AHP-2013 membrane manufactured by Asahi Kasei Corp., having a molecular-weight cutoff of 50,000) at 3 kg/cm² and 200° C., to obtain an ultrafiltrate, which was then adjusted to pH 2.0 with sulfuric acid. Subsequently, 5 L of water was added and the resulting mixture was treated with a reverse osmosis membrane (NTR-7250 membrane manufactured by Nitto Denko Corp, having a molecular-weight cutoff of about 3,000), giving 1 L of a reverse osmosis membrane-treated solution. By this treatment, impurities were removed as filtrate and purified color components were concentrated as a residue. The reverse osmosis membrane-treated solution was concentrated under reduced pressure to prepare 80 g of significantly purified color solution having a color value of $E^{10\%}{}_{1cm}=200$. The color solution contained 3.1% by weight of cyanidin-3-O-β-D-glucoside, i.e., the primary color component of purple corn color. To 80 g of the color solution were added 130 g of water, 40 g of ethyl alcohol, 10 g of citric acid (crystals) to prepare 260 g of purple corn color preparation having a color value of $E^{10\%}{}_{1cm}=60$ (Invention preparation). The color composition was odorless.

(ii) On the other hand, 16 L of purple corn color extract solution was obtained in the same manner as in Referent Example, and subjected to adsorption treatment with synthetic adsorption resin Amberlite XAD-7 (1.5 L), in a way similar to the above. The resin was fully washed with 5 L of water, and the purple corn color was eluted with aqueous solution containing ethanol concentration of 50% v/v, giving 5 L of eluate. The eluate was concentrated under reduce pressure, to thereby obtain 800 g of color solution having a color value of $E^{10\%}{}_{1cm}=100$. To the color solution (800 g) were added 223 g of water, 30 g of citric acid (crystals) and 267 g of ethanol, to prepare 1330 g of purple corn color preparation having a color value of $E^{10\%}{}_{1cm}=60$ (Comparative preparation). The color preparation had an unpleasant odor characteristic of purple corn.

(2) CG-MS Measurement

The amounts of odor components in the preparation of the present invention (Invention preparation) and the Comparative preparation prepared in (1) above were compared using a gas chromatography-mass spectrometer (GC-MS). Specifically stated, 30 g of each color preparation ($E^{10\%}{}_{1cm}=60$) was weighed out, and subjected to extraction with 200 mL of diethyl ether containing 0.5 ppm of methyl octanoate as an internal standard substance. The diethyl ether solution was then dried by evaporation. The amounts of odor components in the obtained concentrate were measured using a gas chromatography-mass spectrometer (GS-MS) under the following conditions:

<GC-MS Measurement Conditions>
GC-MS: Hewlett-Packard 5973, Mass Selective Detector
Column: DB-WAX (0.25 mm×60 m) manufactured by J&W
Temperature conditions:

| | |
|---|---|
| Inlet temperature; | 250° C. |
| Interface temperature; | 230° C. |
| Column temperature; | 50° C. (2 min.) to 220° C. |
| Temperature rise; | 3° C./min |
| Sprit ratio: | 70:1 |
| Ionization voltage: | 70 eV |

The results are presented in FIG. 1. The ion chromatogram of the purple corn color preparation of the present invention (Invention preparation) (FIG. A) shows that the total concentration of odor components other than the internal standard substance (acetic acid, malonic acid diethyl ester, 4-vinyl-2-methoxyphenol and 4-vinylphenol) was extremely low (not higher than 111 ppm). In contrast, FIG. B reveals that the comparative purple corn color Preparation (Comparative preparation) contained volatile components In high concentrations (at a total concentration of 215 ppm). These results agree with the fact that the Comparative preparation had a characteristic unpleasant odor derived from purple corn, whereas the Invention preparation was odorless.

In FIG. 1, the peaks ①, ②, ③ and ④ are attributable to acetic acid, malonic acid diethyl ester, 4-vinyl-2-methoxyphenol and 4-vinylphenol, respectively. The peak IS-1 is attributable to the internal standard substance, i.e., methyl octanoate.

(3) Odor Evaluation and Storage Test

The odors of the Invention preparation and the Comparative preparation prepared in (1) were evaluated by a panel of ten well-trained flavorists, immediately after preparation and after 15- or 30-day storage at 5° C., 25° C. or 38° C. Further, beverage solutions (color value: $E^{10\%}_{1cm}=0.04$, Brix. 10°, 0.2% aqueous citric acid solution without flavorings) were prepared using the color preparations, and the odors of the solutions immediately after the preparation and after storage were evaluated in the same manner as above. Table 1 shows the results.

TABLE 1

| | | | Immed. after preparation | After 15-day storage | After 30-day storage |
|---|---|---|---|---|---|
| Invention preparation | Preparation | 5° C. | A | A | A |
| | | 25° C. | A | A | A |
| | | 38° C. | A | A | A |
| | Beverage | 5° C. | A | A | A |
| | | 25° C. | A | A | A |
| | | 38° C. | A | A | A |
| Comparative preparation | Preparation | 5° C. | B | B | B |
| | | 25° C. | B | B | C |
| | | 38° C. | C | C | C |
| | Beverage | 5° C. | B | B | B |
| | | 25° C. | B | C | C |
| | | 38° C. | B | D | C |

A: Completely odorless
B: Slight unpleasant odor
C: Noticeable unpleasant odor
D: Strong unpleasant odor
E: Extremely strong unpleasant odor In Table 1, the results immediately after preparation show that the Invention preparation is odorless and that the odor in the preparation and beverage comprising the Invention preparation was significantly reduced as compared with the odor of the Comparative preparation and beverage comprising the Comparative preparation. Further, the Invention preparation and beverage thereof were free from deterioration over time, and even after 15- and 30-day storage, they were maintained in odorless state like immediately after preparation. In contrast, the Comparative preparation and beverage thereof had a gradually increased odor when stored for a longer period. These results indicate that the purple corn color prepared by method of the present invention contained not only no or substantially no odor components that emit an odor, but also no impurities that act as the precursor of the odor components.

Experiment 3

(1) Preparation of a Purple Corn Color Preparation

This Experiment was carried out on the assumption that purple corn (ears including cobs and kernels) used as a raw material of a purple corn color contains fumonisins.

A standard fumonisin B1 was add to the purple corn color extract solution (about 16 L) obtained in the same manner as in Referent Example to a concentration of 5 ppm. The resultant fumonisin-containing extract solution was used as the starting material for preparing a purple corn color purification. The fumonisin-containing extract solution was purified according to procedures for Invention preparation and Comparative preparation in Experiment 2, to obtain 793 g of purple corn color preparation of the invention having a color value of $E^{10}_{1cm}=60$ (Invention preparation), and 823 g of comparative purple corn color preparation having a color value of $E^{10\%}_{1cm}=60$ (Comparative preparation), respectively.

(2) Measurement of Mycotoxin (Fumonisin)

Subsequently, the mycotoxin (fumonisin) contents of the purple corn color preparations (Invention preparation, Comparative preparation) prepared in (1) were measured by high-performance liquid Chromatography (HPLC). The procedure for preparing test samples and HPLC condition are the same as those described in Experimental 1.

Figure 2:
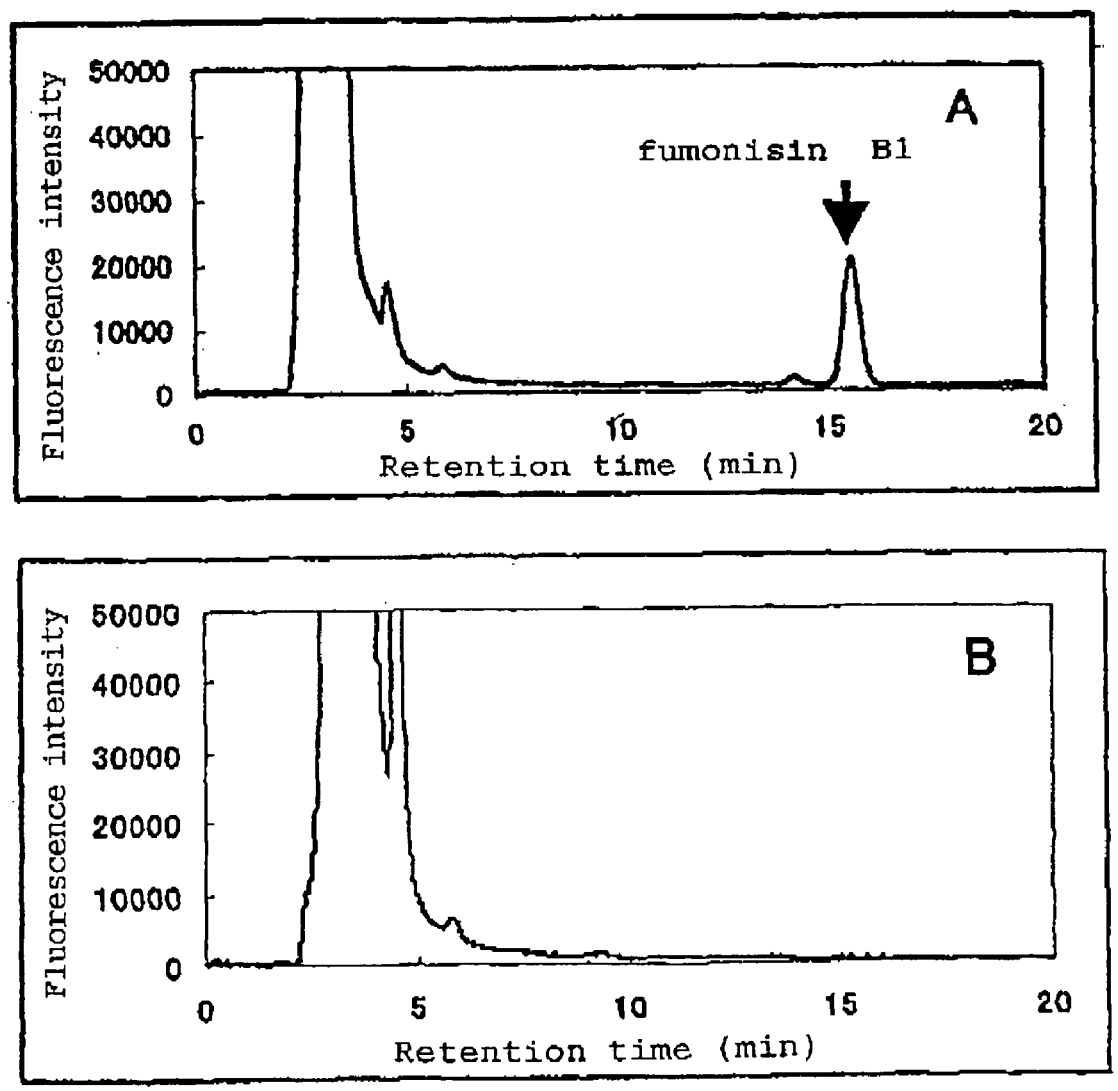
FIG. 2 shows the results of detecting a fumonisin in the comparative purple corn color preparation (FIG. A) and the purple corn preparation prepared by the process of the present invention (FIG. B), by HPLC in Experiment 3.

The analysis results (chromatograms) of the Comparative preparation and Invention preparation are shown in A and B in FIG. 2, respectively. As shown in FIG. 2, no fumonisin B1 was detected in the Invention preparation (FIG. B), whereas 2.96 ppm of fumonisin B1 was detected per color value of $E^{10\%}_{1\ cm}=60$ in the Comparative preparation. These results demonstrate that even if purple corn used as a raw material is infected with a mold, the method of the invention eliminates the toxic substance (fumonisin) of the mold and provides a safe color preparation comprising purple corn color.

The results obtained in Experiments 1 to 3 demonstrate that the method of the present invention significantly eliminates the toxic substance (fumonisin) of the mold and the impurities containing odor components and precursor thereof lead to an unpleasure odor, thereby provides a safe and odorless or low-odor purple corn color preparation. In other words, the method of the present invention is useful as a method for eliminating odor components and precursor thereof lead to an odor, and fumonisins, as a method for preparing a safe and odorless or low-odor purple corn color preparation free of fumonisins, odor components and precursor, or as a method for highly purifying a purple corn color.

Example 1

(1) Preparation of a Purple Corn Color Preparation

About 16 L of purple corn color extract solution was obtained in the same manner as in Referent Example, and subjected to adsorption treatment with synthetic adsorption resin Diaion HP20 (1.5 L, styrene vinylbenzene copolymers, Mitsubishi Chemical Corp.) at SV of 1 and 20° C. The resin was fully washed with 5 L of water, and subjected to elution using aqueous solution containing ethanol concentration of 30% v/v at SV of 1 and 20° C., to collect eluate. The eluate was filtered through an ultrafiltration membrane (AHP-2013 membrane manufactured by Asahi Kasei Corp., having a molecular-weight cutoff of 50,000) at 3 kg/cm² and 20° C., to obtain an ultrafiltrate, which was then adjusted to pH 2.0 with sulfuric acid. Subsequently, 5 L of water was added and the resulting mixture was treated with a reverse osmosis membrane (NTR-7250 membrane manufactured by Nitto Denko Corp, having a molecular-weight cutoff of about 3,000), giving 1 L of a reverse osmosis membrane-treated solution. By this treatment, impurities were removed as filtrate and purified color components were concentrated as a residue. The reverse osmosis membrane-treated solution was concentrated under reduced pressure to prepare 80 g of significantly purified color solution having a color value of $E^{10\%}_{1\,cm}=200$. The color solution contained 3.1% by weight of cyanidin-3-O-β-D-glucoside, i.e., the primary color component of purple corn color. To 80 g of the color solution were added 130 g of water, 40 g of ethanol, 10 g of citric acid (crystals) to prepare 260 g of purple corn color preparation having a color value of $E^{10\%}_{1\,cm}=60$ (Invention preparation). The color composition was odorless.

INDUSTRIAL APPLICABILITY

The purple corn color of the present invention is a safe and an odorless or low-odor color which has been highly purified to eliminate or significantly reduce the toxic substance (fumonisin) of the mold occurring on purple corn used as a raw material, in particular an ear developed from a female flower (cob or kernel), and the offensive or unpleasant odor derived from odor components and impurities contained in the purple corn. Further, the purple corn color of the invention is significantly inhibited from undergoing changes with time, such as "recurrence of odor", which may be caused during long-term storage under light or heat. Accordingly, the color of the invention or the color preparation comprising the color can be used as coloring agent in foodstuffs (e.g., beverages), drugs, quasi-drugs, cosmetics and like products with safety and without the influence of the odor components characteristic of purple corn colors. Moreover, even if purple corn used as a raw material is infected with a mold such as *Fusarium moniliforme* or *F. proliferatum*, the methods of the invention significantly eliminates mycotoxins (fumonisins) and thus provides a safe purple corn color or a purple corn color preparation. Therefore, the method for preparing a purple corn color of the invention is useful to prepare a safe purple corn color.

The invention claimed is:

1. A method for preparing a purple corn coloring agent, which comprises the steps of
   passing a purple corn coloring agent extract solution through an adsorption resin,
   washing the resin with water, and
   desorbing a purple corn coloring agent from the resin using 25 to 45% v/v hydroalcoholic solution as a desorption solution,
   wherein the resulting purple corn coloring agent is characterized in being free of fumonisins.

2. The method according to claim 1, wherein the purple corn coloring agent extract solution is an acid water or an aqueous acid solution containing no more than 20% v/v alcohol.

3. The method according to claim 1, wherein after washing the resin with water, 1.5 to 2.5 times as much desorption solution as the resin by volume is passed through the resin at a SV (space velocity) of 0.8 to 1.5.

4. The method according to claim 1, wherein the adsorption resin is a cross-linked styrene porous polymer.

5. A method for preparing a purple corn coloring agent, which comprises the step of subjecting an adsorption-treated solution obtained by the method of claim 1 to at least one treatment selected from adsorption treatment, ion exchange treatment, acid treatment, extraction treatment and membrane separation treatment.

6. The method according to claim 5, wherein the treatment is a membrane separation treatment.

7. The method according to claim 5, wherein the membrane separation treatment is at least one of reverse osmosis membrane treatment or ultrafiltration membrane treatment.

8. The method according to claim 7, wherein the acid treatment is carried out before the membrane separation treatment.

9. The method according to claim 8, wherein the acid treatment is carried out under high-temperature condition.

10. The method according to claim 1, wherein the desorption solution is 28 to 45% v/v hydroalcoholic solution.

11. A method for eliminating fumonisins that can be present in a purple corn coloring agent, the fumonisins being produced by molds occurring on a purple corn, which comprises the steps of passing purple corn coloring agent extract solution through an adsorption resin, washing the resin with water, and desorping a purple corn color coloring agent from the resin using 25 to 45% v/v hydroalcoholic solution as a desorption solution.

* * * * *